US008777200B2

(12) United States Patent
Ulle

(10) Patent No.: US 8,777,200 B2
(45) Date of Patent: Jul. 15, 2014

(54) CLAMPING DEVICE

(75) Inventor: Detlev Ulle, Mainal (DE)

(73) Assignee: Delaware Capital Formation, Inc., Wilmington, DE (US)

( * ) Notice: Subject to any disclaimer, the term of this patent is extended or adjusted under 35 U.S.C. 154(b) by 528 days.

(21) Appl. No.: 13/078,271

(22) Filed: Apr. 1, 2011

(65) Prior Publication Data

US 2011/0232050 A1 Sep. 29, 2011

Related U.S. Application Data

(63) Continuation of application No. PCT/DE2010/001173, filed on Oct. 8, 2010.

(30) Foreign Application Priority Data

Oct. 9, 2009 (DE) ......................... 10 2009 048 510

(51) Int. Cl.
*B25B 1/14* (2006.01)
*B23Q 3/08* (2006.01)

(52) U.S. Cl.
USPC ............................................. 269/32; 269/228

(58) Field of Classification Search
USPC ....................................... 269/32, 27, 24, 228
See application file for complete search history.

(56) References Cited

U.S. PATENT DOCUMENTS

| | | | | |
|---|---|---|---|---|
| 6,557,841 | B2 | 5/2003 | Dellach et al. | |
| 8,132,800 | B2 * | 3/2012 | Tamai | 269/32 |
| 2004/0046299 | A1 * | 3/2004 | Migliori | 269/32 |
| 2006/0197270 | A1 * | 9/2006 | Migliori | 269/228 |

FOREIGN PATENT DOCUMENTS

| | | |
|---|---|---|
| DE | 86 06 451 | 7/1986 |
| DE | 196 16 441 | 6/1997 |
| DE | 196 45 778 | 5/1998 |
| DE | 202 05 994 | 9/2002 |
| DE | 202 09 237 | 10/2002 |
| DE | 20 2007 010 690 | 11/2007 |
| EP | 1 060 839 | 12/2000 |
| EP | 1 371 452 | 12/2003 |
| EP | 1 524 080 | 4/2005 |

* cited by examiner

*Primary Examiner* — Lee D Wilson
*Assistant Examiner* — Nirvana Deonauth
(74) *Attorney, Agent, or Firm* — Harness, Dickey & Pierce, P.L.C.

(57) ABSTRACT

A clamping device has a toggle lever mechanism (2) with a linearly movable actuator (1) and a pivot shaft (23) with a tensioning arm (21). A mechanism to unlock an over-center position is coupled with the toggle lever mechanism. The mechanism includes a control element (3) that is arranged on the actuator (1) and a rocker (4). The rocker (4) can be brought into adjusting contact with the control element (3). The control element (3) is in the form of a control extension in a direction facing away from the pivot shaft. The actuator (1) is arranged between the pivot shaft (23) and the rocker (4).

13 Claims, 2 Drawing Sheets

CLAMPING DEVICE

CROSS-REFERENCE TO RELATED APPLICATIONS

This application is a continuation of International Application No. PCT/DE2010/001173, filed Oct. 8, 2010, which claims priority to German Application No. 10 2009 048 510.4, filed Oct. 9, 2009. The disclosures of the above applications are incorporated herein by reference.

FIELD

The disclosure pertains to a clamping device including a toggle lever mechanism, a mechanism for unlocking an over-center position, a control element arranged and a rocker. The rocker is brought into adjusting contact with the control element. The control element faces away from the pivot shaft. The toggle actuator is arranged between the pivot shaft and the rocker.

BACKGROUND

A clamping device of this type, essentially consist of a head piece with a drive element arranged thereon. The linearly movable actuator and the tensioning arm can be actuated from the drive. The linear adjustment is converted into a pivoting motion of the tensioning arm of the device by means of an adjusting mechanism arranged in the head piece. The linearly movable actuator and tensioning arm usually can be adjusted into an over-center position in order to also preserve their clamped position in case the operating medium for the drive fails for whatever reason. However, if the operating medium fails, it is also not readily possible to loosen the tensioned clamping device from its over-center position. This is the reason why clamping devices of this type are usually equipped with elements that make it possible to reset or unlock the clamping devices from their over-center positions. In this respect, we refer to the following publications: EP 1 060 839 A2, U.S. Pat. No. 6,557,841 B2, DE 196 16 441 C1 and DE 20 2007 010 690 U1. The unlocking elements of these clamping devices are all arranged in the upper region of the head piece in the pivoting range of the tensioning arm. Namely, they are in alignment with actuators of the adjusting mechanism that extends underneath the locking elements in the head piece.

DE 196 45 778 C1 illustrates a clamping device of the initially cited type. This clamping device consists of a toggle lever mechanism that is provided with a linearly movable actuator and with a pivot shaft for a tensioning arm. A means to unlock an over-center position is assigned to the toggle lever mechanism. The means consist of a control element that is arranged on the actuator (referred to as a stopping face in the publication) and a rocker that can be brought into adjusting contact with the control element (referred to as a control pin in the publication).

SUMMARY

It is an objective of the disclosure to improve clamping devices of the initially described type. The disclosure provides a solution that can be manufactured in a simpler and more cost-efficient fashion that enhances operational reliability.

A clamping device comprises a toggle lever mechanism that includes a linearly movable actuator and pivot shaft with a tensioning arm. A mechanism to unlock an over-center position is coupled with the toggle lever mechanism. The mechanism includes a control element and a rocker. The control element is arranged on the actuator. The rocker is brought into adjusting contact with the control element. The control element is in the form of a control extension in a direction away from the pivot shaft. The actuator is arranged between the pivot shaft and the rocker.

The mechanism for unlocking the adjusting mechanism of the clamping device from the over-center position includes a control element and a rocker. The control element is in the form of a control extension and arranged on the actuator that can be linearly moved by the drive. The rocker that can be brought into adjusting contact with the control extension and actuated from a flank side of the clamping device. The rocker consequently protrudes into the control path of the control extension in the head piece of the device, as described in greater detail below. In this case, the rocker is in the form of a small one-armed lever. It can be carried along by the control extension as far as the over-center position. Accordingly, the lever is arranged at the corresponding location of the head piece. The lever pivoting axis or the pivot shaft of the tensioning arm rigidly connected thereto extend from flank side to flank side of the head piece. Therefore, it is accessible from the outside.

The rocker remains in adjusting contact with the control extension when the over-center position is reached. Thus, the actuator can, if so required, be unlocked from its over-center position via the control extension arranged thereon by actuating the rocker. Due to the arrangement of the rocker at a location in the head piece, which corresponds to the over-center position and is situated on the flank side, lateral access to the pivot shaft lies outside the pivoting range of the tensioning arm. In addition, the design provides an advantage of enabling the lateral assignment of manipulating elements for resetting the rocker, that basically may have any design and (as also described in greater detail below) can be modified in a preferred and enhanced embodiment such that they also make it possible, if so required, to manually press the adjusting mechanism into the over-center position.

The control extension is arranged on the actuator such that it is directed toward the rear side of the clamping device. It is positioned toward the narrow side of the head piece that faces away from the tensioning arm and the pivot shaft Thus, the rocker is also arranged in the corresponding rear region of the head piece where the sensor arrangement is usually accommodated in clamping devices of this type. In the event the actuator is in two parts and therefore has a variable length in the sense of DE 202 09 237 U1 or DE 202 05 994 U1, in this case, the control extension is arranged on the section of the actuator that is situated near the toggle lever mechanism.

Further areas of applicability will become apparent from the description provided herein. The description and specific examples in this summary are intended for purposes of illustration only and are not intended to limit the scope of the present disclosure.

DRAWINGS

The disclosed clamping device and its advantageous embodiments are described in greater detail below with reference to drawings of exemplary embodiments that are viewed from the flank side.

DETAILED DESCRIPTION

Figure 1:
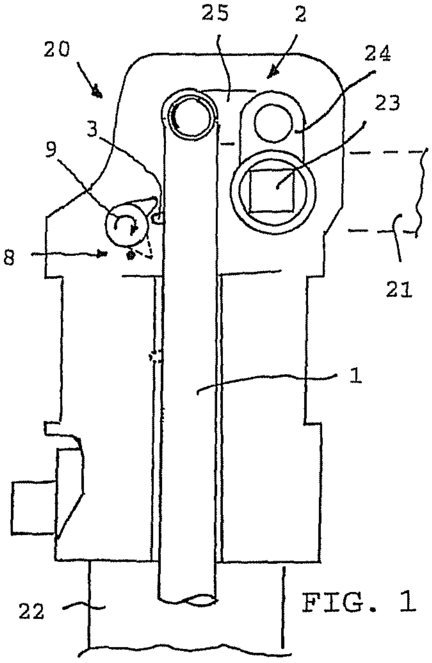
FIG. 1 is a cross-section side view of the clamping device in the closed or clamping position with a simple embodiment of the rocker.

The clamping device is illustrated in a highly schematic fashion in FIGS. 1 to 4. The clamping device includes a toggle lever mechanism 2 that is accommodated in a head piece 20. The toggle lever mechanism 2 is provided with an actuator 1 that can be linearly moved by a (particularly pneumatic) drive 22 (for example, a reciprocating piston). The toggle lever mechanism includes a mechanism for being unlocked from an over-center position. This mechanism includes a control element 3 and a rocker 4. The rocker 4 can be brought into adjusting contact with the control element 3. The toggle lever mechanism 2 also includes conventionally features an intermediate element 25 to produce a connection between the actuator 1 and a shaft lever 24 of a pivot shaft 23 that is connected with a tensioning arm 21.

In such a clamping device, it is important that the control element 3 is in the form of a control extension facing in a direction away from the pivot shaft. Also, the actuator 1 is arranged between the pivot shaft 23 and the rocker 4. The rocker 4 is positioned such that it can be actuated from a flank side of the clamping device.

The control element 3 or the control extension is preferably arranged on the end of the actuator 1 on the side of the toggle lever mechanism. The control element is in the form of a pin and is directed transverse to the actuator 1 and toward the rear side wall 5 of the head piece 20. The pin is at the location of the rocker 4 that is furthermore arranged on the head piece 20 outside the pivoting sector of the tensioning arm 21 connected to the control mechanism 2.

Figure 2:
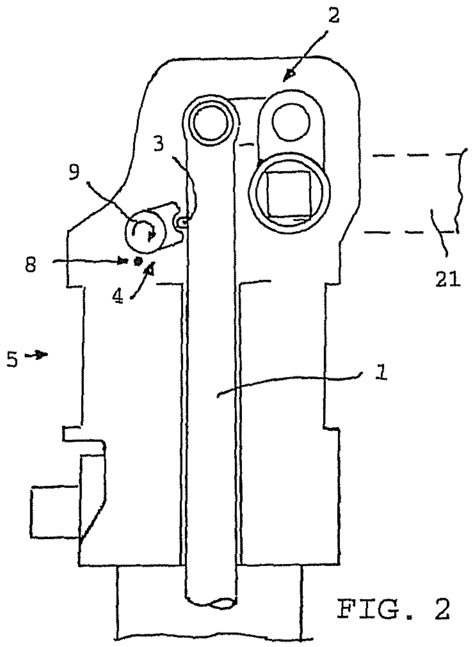
FIG. 2 is a cross-section view of the clamping device according to FIG. 1 with another embodiment of a rocker.
Figure 3:
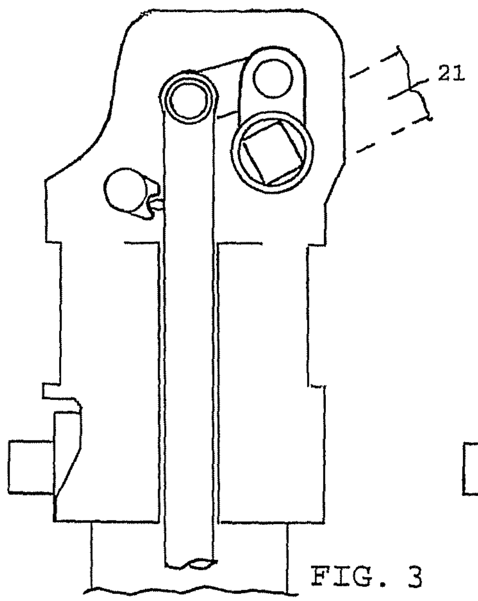
FIG. 3 is a cross-section view of the clamping device according to FIG. 2 in an intermediate position.
Figure 4:
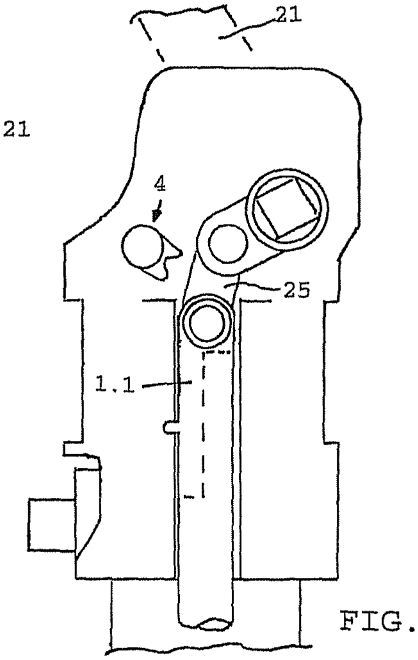
FIG. 4 is a cross-section view of the clamping device according to FIG. 2 in an open position.

In the embodiment according to FIG. 1, the clamping device is in the over-center clamping position or in the closed position, respectively, the rocker 4 only features one lug that protrudes into the control path of the control extension 3. The rocker 4 slightly presses the control element 3 or the control extension and therefore the actuator 1 downward from the over-center position when it is turned in the clockwise direction. The actuator 1 subsequently can be moved further downward until the tensioning arm 21 reaches its open position (see FIG. 4). In this case, the stop 8 ensures that the lug of the rocker 4 continues to protrude into the control path of the control element 3 or the control extension, in the position illustrated with broken lines, such that it can once again be carried along during a stroke of the actuator 1. In order to control the freely rotatable rocker 4, it may include a suitable spring element 9 that, analogous to FIG. 2, is merely indicated in the form of an arrow indicating the effective direction thereof.

Figure 5:
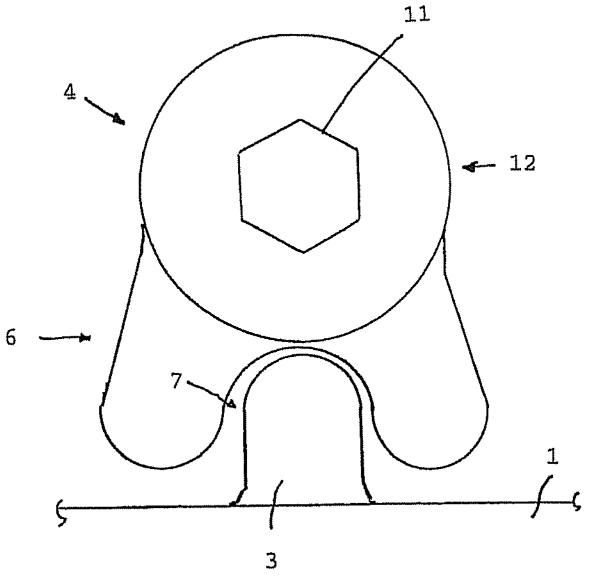
FIG. 5 is an enlarged side elevation view of the rocker.
Figure 6:
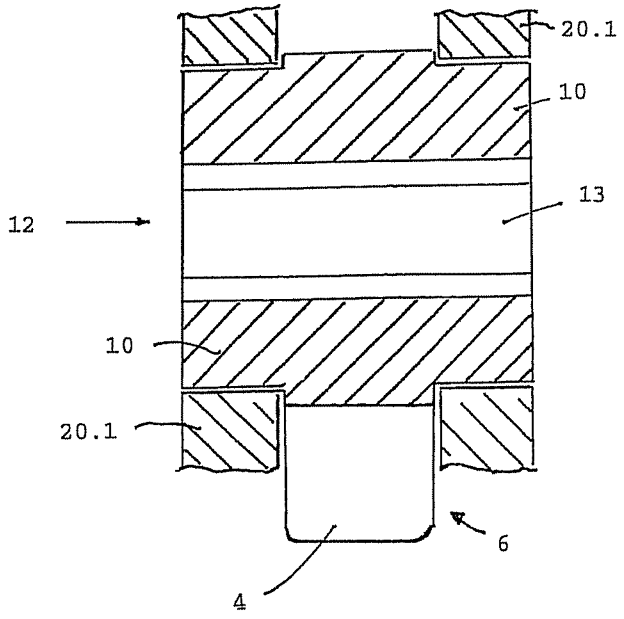
FIG. 6 is a cross-section view of the assignment of the rocker to the head piece.

In order to also make it possible, if so required, to manually press the control mechanism 2 into the over-center position with the aid of the rocker 4, the free end 6 of the rocker 4, according to an advantageous additional development, is provided with a receptacle groove 7. The receptacle groove 7 engages the control element 3 or the control extension, respectively, as illustrated in an enlarged fashion in FIG. 5. In this embodiment, it is also practical to provide a stop 8 and, if applicable, a small spring element 9. The rocker 4 in this embodiment consequently features on its free end 6 two lugs 16, 16' that transform into one another in a well rounded fashion. The control element 3 or the control extension engages between the two lugs 16, 16' in order to carry along the rocker 4 during an upward movement and a downward movement of the actuator 1.

The rocker 4 can be pivoted about an axis (pivot shaft 23) arranged parallel to the axis of the tensioning arm 21 of the clamping device. The rocket 4 is supported in the head piece walls 20.1 by means of bearing journals 10 that are accessible from the outside. The bearing journals 10 are accessible from the flank sides of the head piece 20. At least one of the journals 10 is provided with element 11 such as a hexagonal socket for attaching suitable manipulating elements. The free ends of the journals 10 extend in alignment with the outer surfaces of the head piece walls 20.1. In this respect, the journals 10 also seal the corresponding bearing openings in the head piece walls. In this case, the bearing part 12 of the rocker 4 with its bearing journal 10 is provided with a through-opening 13. Thus, if so required, manipulating elements such as socket wrenches or the like can be inserted into the through-opening from both flank sides of the clamping device in a suitable non-rotating fashion.

If the actuator 1, as initially mentioned, includes two parts such that its length can be varied (see broken lines in the actuator 1 according to FIG. 4), the control element 3 or the control extension is arranged on the section 1.1 of the actuator 1 that is situated near or connected to the toggle lever mechanism.

The present disclosure has been described with reference to a preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A clamping device comprising:

a toggle lever mechanism including a linearly movable actuator and pivot shaft with a tensioning arm; an unlocking mechanism for unlocking an over-center position is coupled with the toggle lever mechanism, the unlocking mechanism includes a control element arranged on the actuator and a rocker, the rocker being adjustable relative to the control element and configured to move between an unlocking position and a locking position, in the unlocking position, the rocker is out of contact with the control element, in the locking position, the rocker is brought into contact with the control element; and the control element is in the form of a control extension in a direction facing away from the pivot shaft, and the actuator is arranged between the pivot shaft and the rocker.

2. The clamping device according to claim 1, wherein the unlocking mechanism is arranged on a head piece of the clamping device outside a pivoting sector of the tensioning arm that is connected to the toggle lever mechanism.

3. The clamping device according to claim 1, wherein a free end of the rocker is provided with a receptacle groove for the engagement of the control element.

4. The clamping device according to claim 1, further comprising a pivoting motion limit stop for engaging the rocker at least in the unlocking direction.

5. The clamping device according to claim 1, further comprising a spring element acting on the rocker that is effective in the unlocking direction.

6. The clamping device according to claim 1, further comprising at least one bearing journal on the rocker that is supported in the clamping device.

7. The clamping device according to claim 1, wherein the rocker or its bearing journal is accessible from outside the clamping device.

8. The clamping device according to claim 6, wherein the bearing journal includes an element for attaching a manipulating element.

9. The clamping device according to claim 6, further comprising a bearing part of the rocker including the bearing journal is provided with a through-opening.

10. The clamping device according to claim 1, wherein the control element is arranged such that it is directed toward a rear side of the clamping device.

11. The clamping device according to claim 1, wherein the actuator includes two parts and has a variable length, the control element is arranged on a section of the actuator that is situated near the toggle lever mechanism.

12. A clamping device comprising: a toggle lever mechanism including a linearly movable actuator and pivot shaft with a tensioning arm; a mechanism for unlocking an over-center position is coupled with the toggle lever mechanism, the mechanism includes a control element arranged on the actuator and a rocker, the rocker being adjustable relative to the control element and configured to be brought into contact with the control element; the control element is in the form of a control extension in a direction facing away from the pivot shaft, and the actuator is arranged between the pivot shaft and the rocker; and a pivoting motion limit stop for engaging the rocker in at least an unlocking direction.

13. A clamping device comprising:

a toggle lever mechanism including a linearly movable actuator and pivot shaft with a tensioning arm; a mechanism for unlocking an over-center position is coupled with the toggle lever mechanism, the mechanism includes a control element arranged on the actuator and a rocker, the rocker being adjustable relative to the control element and configured to be brought into contact with the control element; the control element is in the form of a control extension in a direction facing away from the pivot shaft, and the actuator is arranged between the pivot shaft and the rocker; and a spring element acting on the rocker, the spring element is effective in an unlocking direction.

* * * * *

UNITED STATES PATENT AND TRADEMARK OFFICE

CERTIFICATE OF CORRECTION

PATENT NO. : 8,777,200 B2
APPLICATION NO. : 13/078271
DATED : July 15, 2014
INVENTOR(S) : Detlev Ulle It is certified that error appears in the above-identified patent and that said Letters Patent is hereby corrected as shown below:

Title Page
Item [75] "Mainal (DE)" should be --Maintal (DE)--

In the Specification
Column 2
Line 43 after "shaft", insert --.--

Signed and Sealed this
Twenty-eighth Day of October, 2014

Michelle K. Lee

Michelle K. Lee
*Deputy Director of the United States Patent and Trademark Office*